US009531793B2

(12) United States Patent
Shah et al.

(10) Patent No.: US 9,531,793 B2
(45) Date of Patent: Dec. 27, 2016

(54) DISPLAYING AND NAVIGATING IMPLICIT AND EXPLICIT ENTERPRISE PEOPLE RELATIONSHIPS (71) Applicant: Microsoft Technology Licensing, LLC, Redmond, WA (US)

(72) Inventors: Viral Shah, Oslo (NO); Berit Herstad, Oslo (NO); Vikramjeet Singh Jassal, Lørenskog (NO); Alexander Kempton, Oppegård (NO); Ståle Sørensen, Oslo (NO); Sveinar Rasmussen, Oslo (NO); Alexander Distel, Oslo (NA); Zoran Dovedan, Oslo (NO); Ivan Dijan, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 332 days.

(21) Appl. No.: 14/194,651

(22) Filed: Feb. 28, 2014

(65) Prior Publication Data

US 2015/0249704 A1    Sep. 3, 2015

(51) Int. Cl.
*G06F 3/048* (2013.01)
*H04L 29/08* (2006.01)
(Continued)

(52) U.S. Cl.
CPC ............. *H04L 67/10* (2013.01); *G06F 3/0481* (2013.01); *G06Q 10/10* (2013.01); *G06Q 50/01* (2013.01); *H04L 41/22* (2013.01)

(58) Field of Classification Search
USPC ...................................... 715/734; 705/10, 11
See application file for complete search history.

(56) References Cited

U.S. PATENT DOCUMENTS 7,167,910 B2 * 1/2007 Farnham ............... G06F 3/0481
709/206
7,519,542 B1    4/2009 Waingold
(Continued)

FOREIGN PATENT DOCUMENTS

EP    2426634 A1    3/2012
WO    2013097026 A1    7/2013

OTHER PUBLICATIONS

"International Search Report and Written Opinion Issued in PCT Patent Application No. PCT/US2015/017617", Mailed Date: May 6, 2015, 10 Pages.

(Continued)

*Primary Examiner* — Matthew Ell
(74) *Attorney, Agent, or Firm* — Julie Kane Akhter; Tom Wong; Micky Minhas (57) ABSTRACT

A network map of an individual's implicit and explicit people relationships across multiple workloads is provided. Relationships between people may be leveraged and ranking for people relationships may be performed based on activities across multiple workloads. People relationships may be displayed in the network map to provide a visual understanding of relationships and connections. Navigation to any person represented in the network map may be enabled, and commonalities in relationships between a navigating user and a given person navigated to in the network map may be exposed. Trending items and activity streams for a person or group of persons may be shown in the network map.

16 Claims, 7 Drawing Sheets

(51) Int. Cl.
  *G06F 3/0481* (2013.01)
  *H04L 12/24* (2006.01)
  *G06Q 50/00* (2012.01)
  *G06Q 10/10* (2012.01)

(56) References Cited

U.S. PATENT DOCUMENTS

| | | | |
|---|---|---|---|
| 7,685,016 B2* | 3/2010 | Flores | G06Q 10/06 |
| | | | 705/7.11 |
| 8,249,903 B2 | 8/2012 | Pendergraft et al. | |
| 8,554,794 B2 | 10/2013 | Brydon et al. | |
| 8,572,129 B1 | 10/2013 | Lee et al. | |
| 2005/0278325 A1* | 12/2005 | Mihalcea | G06F 17/277 |
| 2010/0082695 A1 | 4/2010 | Hardt | |
| 2010/0161369 A1 | 6/2010 | Farrell et al. | |
| 2011/0004529 A2 | 1/2011 | Finn et al. | |
| 2011/0283205 A1 | 11/2011 | Nie et al. | |
| 2012/0144317 A1 | 6/2012 | Balasubramanian et al. | |
| 2013/0226910 A1 | 8/2013 | Work et al. | |
| 2013/0246521 A1* | 9/2013 | Schacht | G06Q 50/01 |
| | | | 709/204 |
| 2013/0275429 A1 | 10/2013 | York et al. | |
| 2014/0019533 A1* | 1/2014 | Sherman | H04L 51/00 |
| | | | 709/204 |

OTHER PUBLICATIONS

Healy, Kieran, "Using Metadata to Find Paul Revere", Published on: Jun. 9, 2013, Available at : http://kieranhealy.org/blog/archives/2013/06/09/using-metadata-to-find-paul-revere/.

Imam, Ali, "Visualize your LinkedIn network with InMaps", Published on: Jan. 24, 2011, Available at: http://blog.linkedin.com/2011/01/24/linkedin-inmaps/.

"Second Written Opinion Issued in PCT Application No. PCT/US2015/017617", Mailed Date: Jan. 22, 2016, 6 Pages.

"International Preliminary Report on Patentability Issued in PCT Patent Application No. PCT/US2015/017617", Mailed Date: Apr. 18, 2016, 7 Pages.

* cited by examiner

DISPLAYING AND NAVIGATING IMPLICIT AND EXPLICIT ENTERPRISE PEOPLE RELATIONSHIPS

BACKGROUND

In a workplace, individuals are oftentimes connected through formalized groups as well as through activities across a variety of workloads. For example, individuals may share explicit relationships with other people according to an organizational structure (e.g., peers, managers, directs, etc.), and may share implicit relationships with others determined according to shared activities (e.g., direct communication between individuals, individuals included on distribution lists together, meeting attendees, an individual following another person, an individual "liking" a document created by another person, etc.).

Oftentimes, people in a workplace may have trouble contextualizing and identifying who other people in the organization are. While a user may be acquainted with another person in the organization, he/she may not know who the other person works with, who the other person's colleagues are, who he/she and the other person have in common, etc.

A user may be able to go to a specific service (e.g., a traditional enterprise search, address book, web search, consumer service, etc.) to see activities related to an individual or entity on a specific workload; however, it is oftentimes difficult for users to get an overview of an individual's explicit and/or implicit people relationships across multiple workloads. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

According to embodiments, relationships between people may be leveraged and ranking for people relationships may be performed based on activities across multiple workloads. People relationships may be displayed in a network map to provide a visual understanding of relationships and connections. Navigation to any person represented in the network map may be enabled, and commonalities in relationships between a navigating user and a given person navigated to in the network map may be exposed. In addition, trending items and activity streams for a person or group of persons may be shown in the network map.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Embodiments of the present invention are directed to a mapping of an individual's implicit and explicit people relationships across multiple workloads. Relationships between people may be leveraged and ranking for people relationships may be performed. A network map may be displayed in a people page user interface for providing an intuitive and easily navigable display of people relationships. A user may be able to see commonalities in relationships between himself/herself and an individual in focus and may be more informed of how individuals and groups are connected with more relevance. Trending items and activity streams for a person or group of persons may be shown in the network map.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Figure 1:
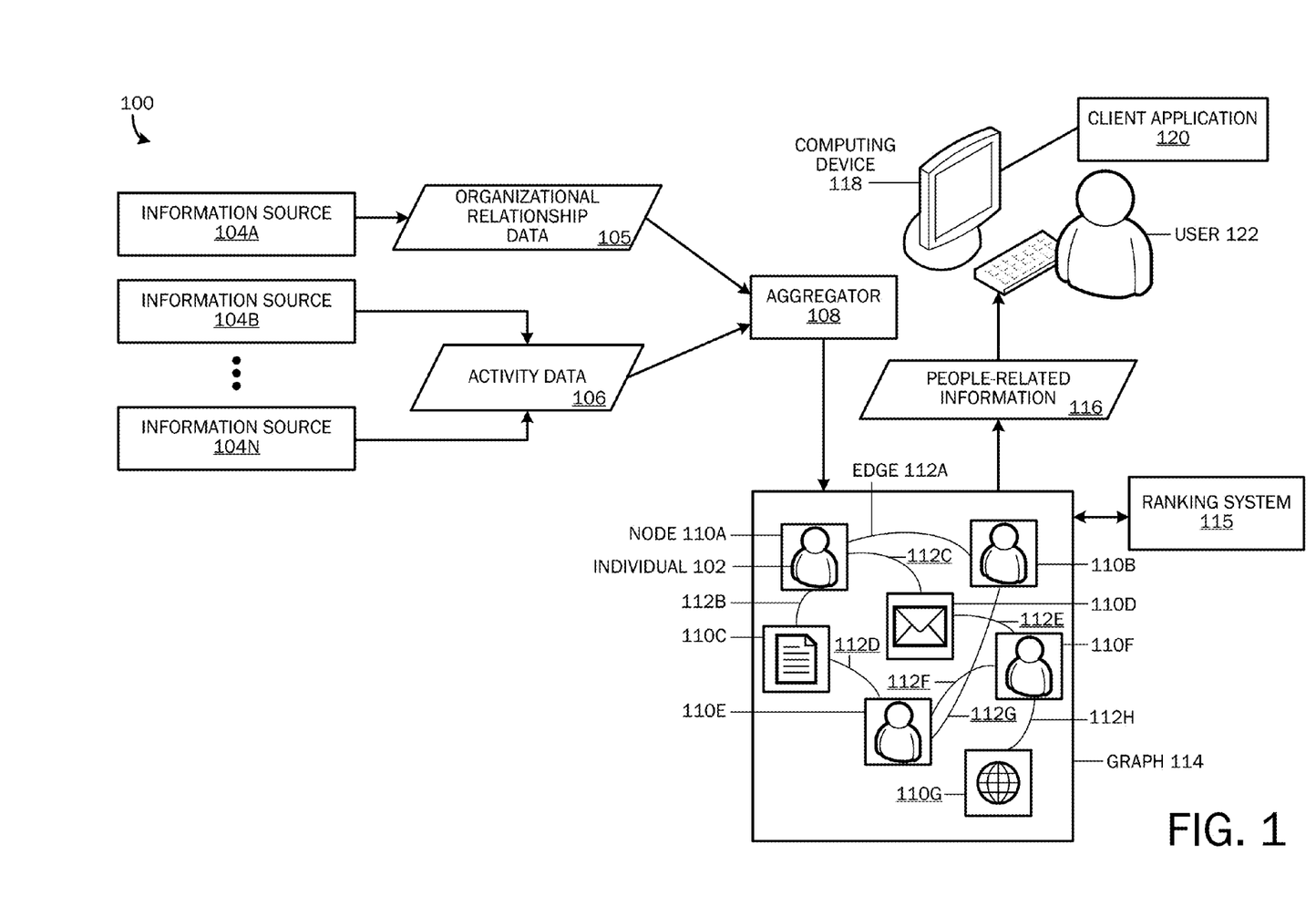
FIG. 1 is a block diagram of one embodiment of a system for providing a network map of an individual's implicit and explicit people relationships across multiple workloads.

Referring now to the drawings, in which like numerals represent like elements, various embodiments will be described. FIG. 1 is a block diagram illustrating a system architecture 100 for providing a network map of an individual's implicit and explicit people relationships across multiple workloads. The system architecture 100 includes an aggregator 108 operable to collect organizational relationship data 105 and activity data 106 for an individual 102 from a plurality of information sources 104A-N (collectively 104) and store the activity data 106 in a graph 114. The information sources 104 may include various types of information sources such as social networking services, enterprise social network services, online productivity software suites (which may include applications such as, but not limited to, a word processing application, a spreadsheet application, a slide presentation application, a notes taking application, a calendaring application, a video conferencing and instant messaging application, etc.), collaboration services, communication software, etc.

Activity data 106 may comprise various types of information such as, but not limited to, presence data, interaction data, data associated with communication with another person (e.g., emailing, messaging, conferencing, etc.), data associated with an individual's activity stream (e.g., authoring or modifying a document, liking, commenting, following, or sharing a document, following a person, commenting on a feed, etc.), trending data, group membership (e.g., inclusion in a distribution list, attendee in a meeting invitation, etc.). Organizational relationship data 105 may comprise various types of information such as, but not limited to, data associated with a project structure or organizational structure (e.g., who an individual works with, works for, is a peer to, directs, manages, is managed by, etc.).

As mentioned above, the organizational relationship data 105 and activity data 106 may be stored in a graph 114. Actions and people relationships may be stored as edges 112A-H (collectively 112), and people interacted with and entities that are acted upon may be stored as nodes 110A-G (collectively 110). For example, a node 110 may include an individual 102 (nodes 110A,B,E,F), a group of individuals, a document (node 110C), an email or other communication type (node 110D), a webpage (node 110G), etc.

An edge 112 may include various types of actions (e.g., like, comment, follow, share, authoring, modifying, communication, participation, etc.) and relationships (i.e., relationship edge 112A). Consider for example that an individual 102 "likes" a certain document (i.e., selects a "like" option associated with the document). The individual and the document may be stored as nodes 110 and the "like" selection may be stored as an edge 112.

A relationship edge 112A may include explicit relationships and/or implicit relationships. Explicit relationships may include relationships defined according to an organization structure and data (i.e., organizational relationship data 105). For example, an explicit relationship may include an individual's manager, peers, directs, etc. Explicit relationships may be stored as edges 112 such as manager edges, peer edges, directs edges, etc. Implicit relationships may include working with relationships and other relationships determined according to activity in one or more workloads (i.e., activity data 106 from one or more information sources 104). For example, an implicit relationship may include an individual 102 following another person on an enterprise social network service (information source 104), being included on a distribution list with another person, is a co-author of a document with another person, emailing (or other type of communication) with another person, group memberships, commenting on another person's feed, etc. According to an embodiment, an implicit relationship may be stored as a working with edge in the graph 114. The term "relationship node" 110B will be used herein to describe a node 110 connected to an individual 102 or user 122 via a relationship edge 112A.

The system 100 may comprise a ranking system 115 operable to calculate weights based on implicit and explicit signals generated through activity on the plurality of workloads, such as an amount and type of activity an individual 102 has with another person. For example, if an individual 102 communicates via email with a first information worker (IW) daily, and is frequently an attendee of meetings that the first IW is also an attendee of, the weight of a relationship edge 112A between the individual 102 and the first IW may be higher than the weight of a relationship edge 112A between the individual 102 and a second IW whom the individual 102 emails less frequently and who share a common "like" of a document on a social network site. Edges may also be weighted according to a type of activity. For example, an "edit" or "share" operation may be considered to be more important than a "like" operation, and thus may have a higher weighting than the "like" operation. An individual's relationship edges 112A and activity edges may be ranked according to their calculated weights.

A user 122 may selectively view a network map of implicit and explicit people relationships across multiple workloads for an individual 102. The user 122 may utilize a client application 120 on a computing device 118 to request people-related information 116. According to one embodiment, a request may be triggered via navigation to or selection of a representation of an individual 102 from a user interface, for example, a user interface displayed on computing device 118 via client application 120.

The computing device 118 may be one of a variety of suitable computing devices described below with reference to FIGS. 4 through 6. For example, the computing device 118 may include a tablet computing device, a desktop computer, a mobile communication device, a laptop computer, a laptop/tablet hybrid computing device, a gaming device, or other type of computing device for executing applications 120 for performing a variety of tasks.

The application 120 illustrated in association with computing device 118 is illustrative of any application having sufficient computer executable instructions for enabling embodiments of the present invention as described herein. The application 120 may include a thick client application, which may be stored locally on the computing device 118, or may include a thin client application (i.e., web application) that may reside on a remote server and accessible over a network, such as the Internet or an intranet. A thin client application may be hosted in a browser-controlled environment or coded in a browser-supported language and reliant on a common web browser to render the application executable on a computing device 118.

When a request for people-related information 116 for an individual 102 is received, the graph 114 may be queried for the particular individual's node 110, and a request may be made for all people relationship edges 112A and relationship nodes 110B related to the individual's node 110. For example, for a particular individual 102, a request may be made for his/her manager edge, his/her peer edges, his/her directs edges, his/her working with edges, etc., and the nodes to which the edges connect.

According to an embodiment, a request may also be made for the requesting user's 122 node 110 and his/her working with edges. A query may be made for an intersection of people the user 122 and the individual 102 have in common according to their working with edges. An intersection or overlap between the user's 122 and the individual's 102 working with edges may be determined to be people both the user 122 and the individual 102 work with and classified as "people in common" or "people we both work with."

The request for people related information 116 may be a search API, and may comprise authorization information for determining what content the user 122 has been granted access to retrieve. A response may be generated and may comprise people related information 116 of relationships (associated with the individual 102) to which the user 122 has been granted access. The people related information 116 may be provided to the client application 120 and displayed in a user interface that will be described in detail with reference to FIG. 2.

Figure 2:
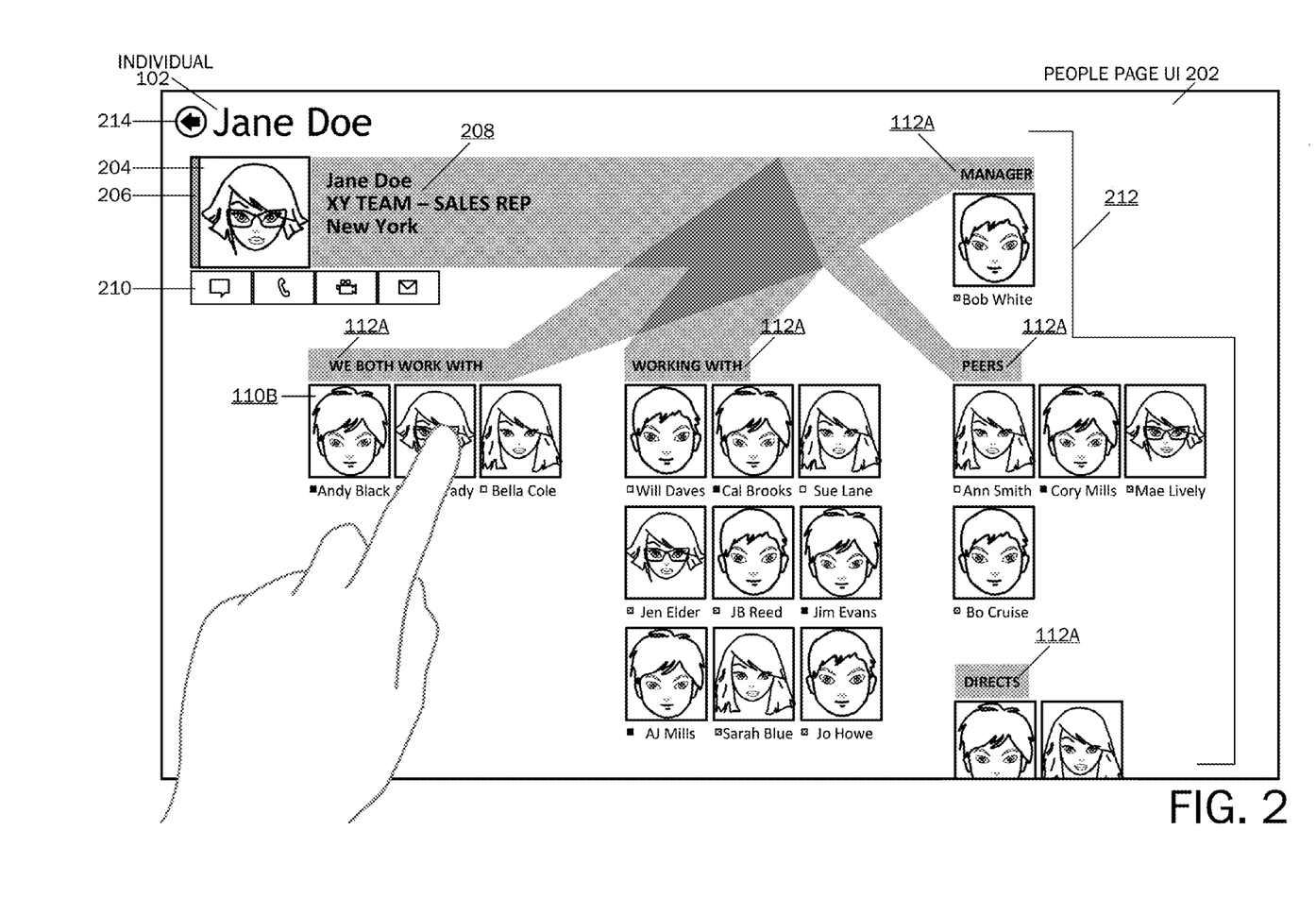
FIG. 2 is an example of a people page user interface comprising a network map of an individual's implicit and explicit people relationships across multiple workloads.

Referring now to FIG. 2, an example people page user interface 202 for an individual 102 is illustrated that may be displayed on any suitable computing device 118 described above. The people page user interface 202 may provide an intuitive and easily navigable display of people relationships in a network map. A user 122 may be able to see commonalities in relationships between himself/herself and the individual 102 in focus, and may be more informed of how individuals and groups are connected with more relevance. According to embodiments, user interaction with a people page user interface 202 may be accomplished via a variety of interaction methods including keyboard entry, mouse entry, gesture entry, voice command, eye tracking, thin air gesture entry, electronic inking entry, and/or combinations thereof.

As illustrated, a people page user interface 202 for a specific individual 102 may comprise a display of the individual's name and a picture, avatar, or other visual representation 204 of the individual 102. Other information 208 such as a team the individual 102 is a part of, the individual's job title, a biography, etc., and presence information 206 for the individual 102 may also be displayed. One or more connectivity buttons 210 may be provided for enabling a user 122 to connect with the individual 102. Connectivity buttons 210 may include, but are not limited to, an IM button, a call button, a video button, and an email button. For example, selection of an instant messaging (IM) button 210 by the user 122 may launch an IM session between the user 122 and the individual 102.

According to embodiments, the people page user interface 202 may comprise an intuitive and easily navigable network map 212 of the individual's 102 people relationship edges 112A and relationship nodes 110B. The people (i.e., relationship nodes 110B) connected to the individual 102 by the people relationship edges 112A may be displayed as selectable thumbnail images grouped according to the type of relationship they share with the individual 102. A thumbnail image may be a photo or image of the person if a photo or image is available, or may be an avatar or other type of visual representation of the person.

As illustrated, the network map 212 may include a first group that may be classified as "manager" comprising a thumbnail image of the person or people (relationship node 1108) connected to the individual 102 via a manager relationship edge 112A, a next group that may be classified as "peers" comprising thumbnail images of the people (relationship nodes 110B) connected to the individual 102 via a peer relationship edge 112A, a next group that may be classified as "directs" comprising thumbnail images of the people (relationship nodes 110B) connected to the individual 102 via a directs relationship edge 112A, a next group that may be classified as "working with" comprising thumbnail images of the people (relationship nodes 110B) connected to the individual 102 via a working with relationship edge 112A, and a next group that may be classified as "we both work with" or "people in common" comprising thumbnail images of the people (relationship nodes 110B) who are connected to both the individual 102 and the user 122. According to embodiments, an individual's 102 groups may not intersect, that is, the groups may be mutually exclusive. For example, if an implicit relationship is generated between the individual 102 (in this example, Jane Doe) and Jane's manager (in this example, Bob White), Bob would not be displayed in Jane's working with group because an explicit relationship ("manager") with Bob has already been defined. As can be appreciated, the user 122 may be able to easily see commonalities in relationships between himself/herself and the individual 102 in focus.

As described above, implicit relationships such as working with relationships and we both work with relationships may include relationship edges 112A determined according to activity in one or more workloads (i.e., activity data 106 from one or more information sources 104). As can be appreciated, the number of implicit relationships an individual 102 has can be quite large. Accordingly, a top n implicit relationships may be displayed, wherein the top n implicit relationships are the individual's highest ranking relationship edges 112A according to their calculated weights as described in FIG. 1. The n may be a predetermined number or a selectable number.

As mentioned, the thumbnail images of people connected to the individual 102 by the people relationship edges 112A (i.e., relationship nodes 110B) may be selectable. If a thumbnail image is selected, the relationship node 1108 associated with the selected thumbnail image may be queried in the graph 114, and the people page UI 202 may be navigated to the selected person's people page comprising his/her people-related information 116. For example, if a user 122 selects the thumbnail image associated with Ana Brady, the people page user interface 202 transitions from Jane Doe's relationship network map 212 to Ana Brady's relationship network map, wherein Ana's relationship edges 112A and relationship nodes 110B may be displayed in the people page user interface 202. The people page user interface 202 may also comprise a back button 214, which when selected may provide for navigation to a previously viewed relationship network map 212.

According to an embodiment, the people page user interface 202 may include a display of an individual's activity stream, which may comprise a listing of activity-related edges 112 and the entities, documents, etc. (stored as nodes 110) upon which were acted. An activity-related edge 112 may comprise an action performed by the individual 102 associated with authoring or modification of a document, trending data, feedback data (e.g., like, comment, follow, share, etc.), etc.

According to another embodiment, the people page user interface 202 may comprise a display of trending items for the individual 102 or a group with which the individual 102 is associated. A query may be performed for activity-related edges 112 and activity-related nodes 110 of the individual's implicit and explicit relationship nodes 110B. Utilizing this information, a determination may be made as to what items may be trending around the individual 102. For example, an individual 102 may have twenty explicit relationships and eighty implicit relationships. A query may be made for the items that those one hundred people may be viewing, modifying, liking, commenting on, etc. Based on those activities, a determination may be made as to which items may be trending or popular around the individual 102. The determined items may be displayed in the individual's people page user interface 202.

Figure 3:
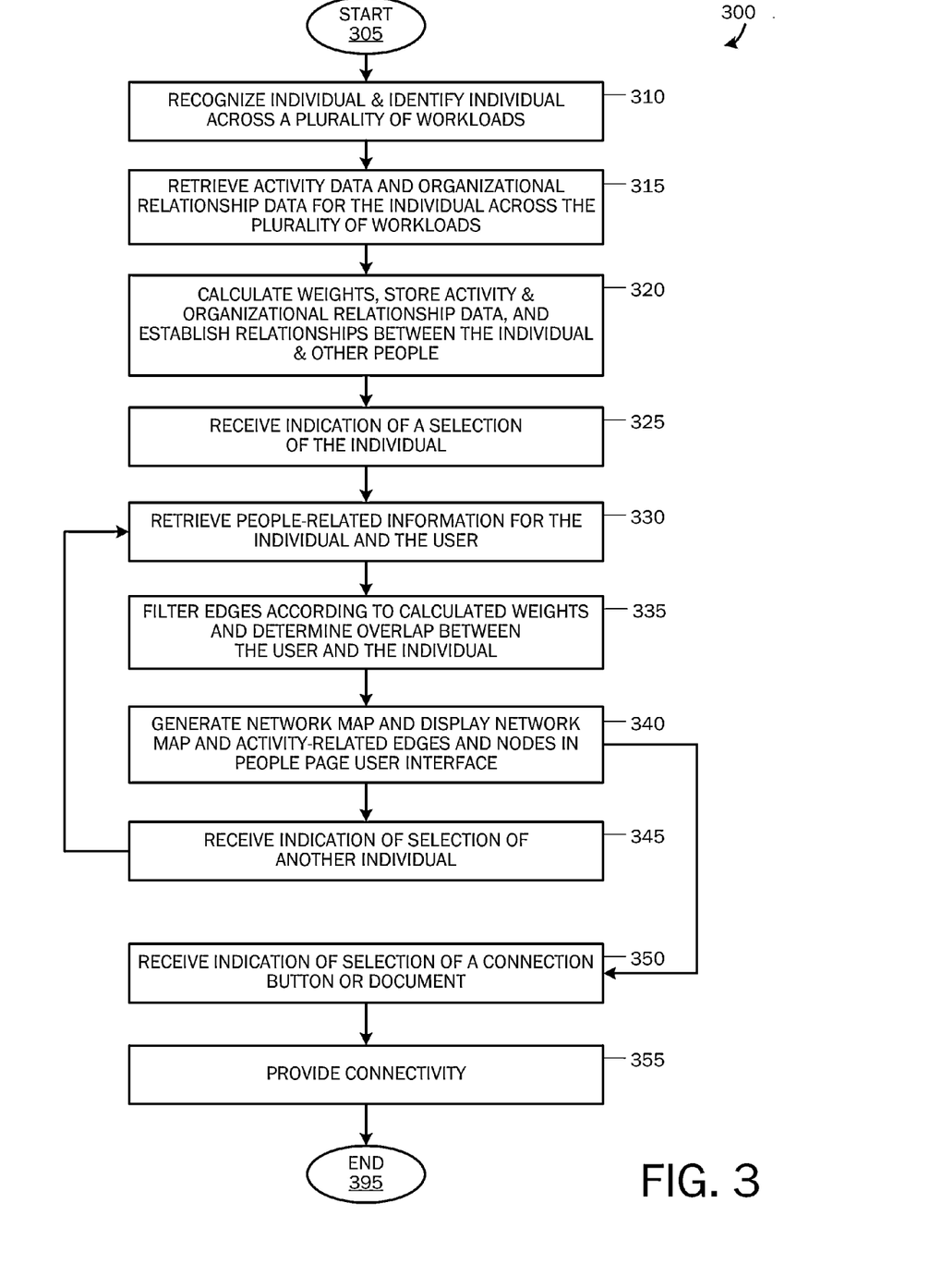
FIG. 3 is a flow chart of a method for providing a network map of an individual's implicit and explicit people relationships across multiple workloads.

FIG. 3 is a flow chart showing one embodiment of a method 300 for providing a network map of an individual's implicit and explicit people relationships across multiple workloads. The method 300 starts at OPERATION 305 and proceeds to OPERATION 310, where an individual 102 or group is recognized and identified across a plurality of workloads (information sources 104). As described above, information sources 104 may include various types of information sources such as social networking services, enterprise social network services, online productivity software suites, collaboration services, communication software, etc. According to an embodiment, OPERATION 305 may include a set-up process where the individual 102 or group may indicate which information sources 104 to utilize for providing activity information and may enter authentication information for the various information sources 104.

The method 300 may proceed to OPERATION 315, where organizational relationship data 105 and activity data 106 for the individual 102 may be retrieved from one or more of the plurality of workloads or information sources 104. As described above, activity data 106 may comprise various types of information such as, but not limited to, presence data, data associated with authoring or modification of a document, trending data, feedback data (e.g., like, comment, follow, share, etc.), data associated with whom an individual 102 interacts and communicates, etc. Organizational relationship data 105 may comprise data associated with organizational structure (e.g., who an individual works with, works for, is a peer to, directs, manages, is managed by, etc.). The one or more workloads or information sources 104 may include information sources such as social networking services, enterprise social network services, online productivity software suites, collaboration services, communication software, etc.

At OPERATION 320, weights of the individual's edges 112 may be calculated based on implicit and explicit signals generated through activity on the plurality of workloads, and the relationship data 105 and activity data 106 may be stored in a graph 114 with their calculated weights as nodes 110 and edges 112. That is, relationship data 105 and the activity data 106 may be analyzed, weights may be calculated according to explicit relationships and amount and type of activities/interactions with other people, and relationships may be established between the individual 102 and people with whom the individual has interacted and people with whom the individual is associated according to an organization or project structure. Additionally, relationships may be established between the individual 102 and other entities (e.g., documents, emails, webpages, etc.) upon which an activity was performed by the individual 102 or by other people with whom the individual 102 is associated implicitly and/or explicitly.

At OPERATION 325, an indication of a selection of or navigation to the individual's 102 page may be received. For example, the individual's 102 thumbnail displayed in a people page user interface 202 may be selected by a user 122.

The method 300 may proceed to OPERATION 330, where the selected individual's 102 people-related information 116 and the user's 122 people-related information 116 may be retrieved from the graph 114. Additionally, the selected individual's 102 activity stream may be retrieved from the graph 114.

At OPERATION 335, a determination may be made as to which relationships and activities to display. The individual's relationship edges 112A and activity edges may be ranked and filtered according to their calculated weights, and the most relevant relationships and activities amongst a potentially large amount of relationships and activities may be selected for display. OPERATION 335 may also include determining an overlap of relationship edges 112A between the individual 102 and the user 122 for determination of which people may be classified and displayed as "we both work with" or "people in common."

The method 300 may proceed to OPERATION 340, where a people page user interface 202 may be generated for displaying the individual's 102 people-related information 116, for example, as illustrated and described above with reference to FIG. 2. The people-related information 116 may be displayed in a network map 212 and may comprise the individual's explicit relationship edges 112A and nodes 1106 (i.e., organization structured relationships such as directs, peers, managers, etc.) and implicit relationship edges 112A and nodes 1106 (i.e., working with relationships and other relationships determined according to activity in one or more workloads such as a person who the individual 102 is following on an enterprise social network service (information source 104), a person on a distribution list that the individual is also included, a co-author of a document, a person with whom the individual communicates regularly via email or other communication type, a co-member of a group, etc.). According to embodiments and described above, the relationship edges 112A and nodes 1106 may be selected for display according to their calculated weights. An activity stream for the individual 102 may also be displayed. For example, the activity stream may include activity-related edges 112, as well as a display of documents and other entities acted upon by the individual 102.

The method 300 may proceed to either OPERATION 345 or 350. At OPERATION 345, an indication of a selection of a person displayed in the individual's 102 network map 212 may be received, for example, via a selection of the person's thumbnail image. The method 300 may then return to OPERATION 330, to retrieve people-related information 116 and an activity stream for the selected person.

At OPERATION 350, an indication of a selection of a connectivity button 210 or a document or other type of entity displayed in the individual's 102 activity stream may be received. If a connectivity button 210 is selected, the method 300 may proceed to OPERATION 355, where connectivity may be provided. For example, a communication session may be launched according to a type of connectivity button 210 selected. If a document or other type of entity displayed in the individual's 102 activity stream is selected, the method 300 may proceed to OPERATION 355, where connectivity to the selected document or entity may be provided. For example, if a document is selected, the document may be opened in an appropriate application for the selected document (e.g., a presentation may be opened in a slide presentation application). The method may end at OPERATION 395.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
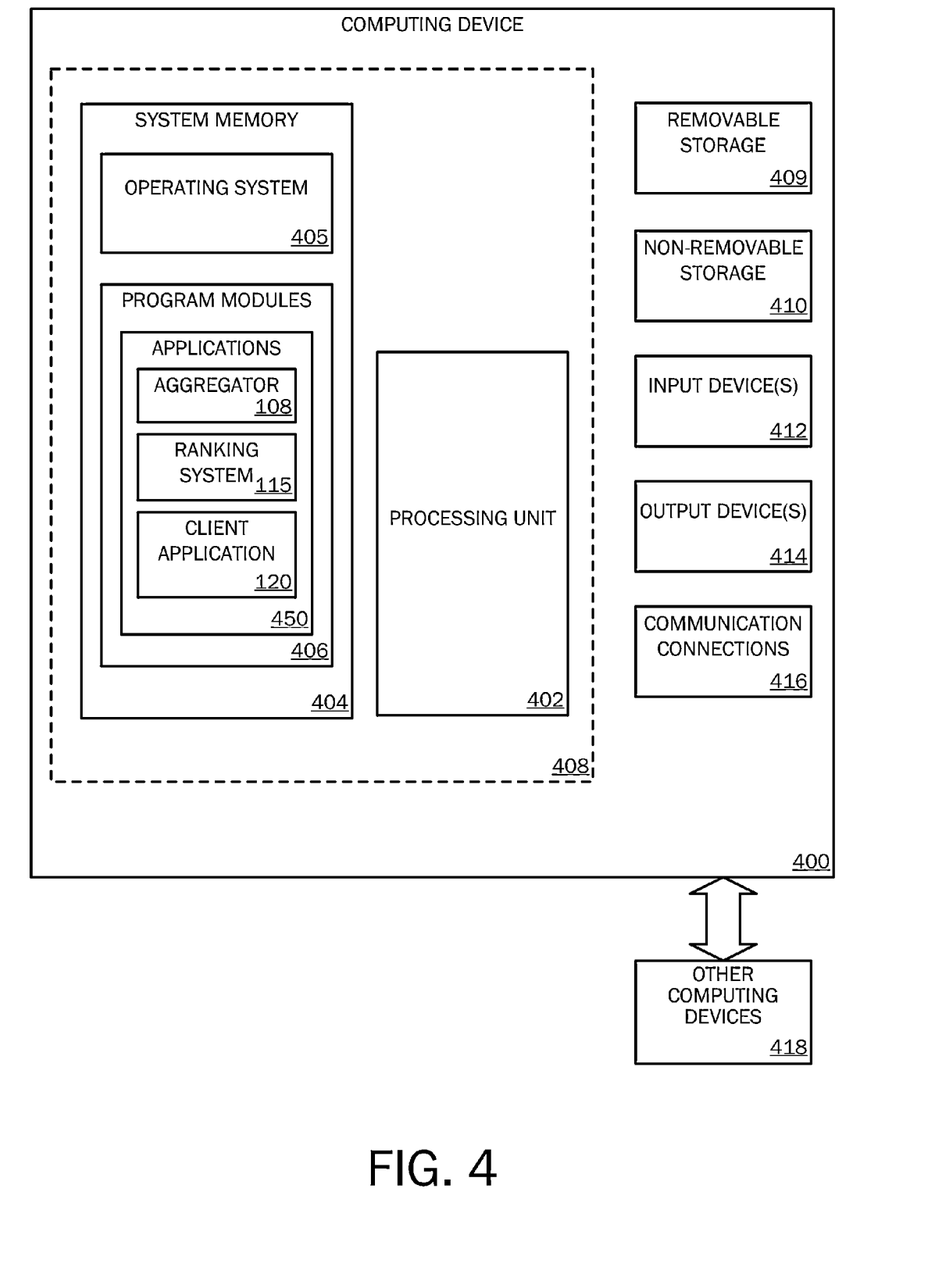
FIG. 4 is a block diagram illustrating example physical components of a computing device with which embodiments of the invention may be practiced.
Figure 5A:
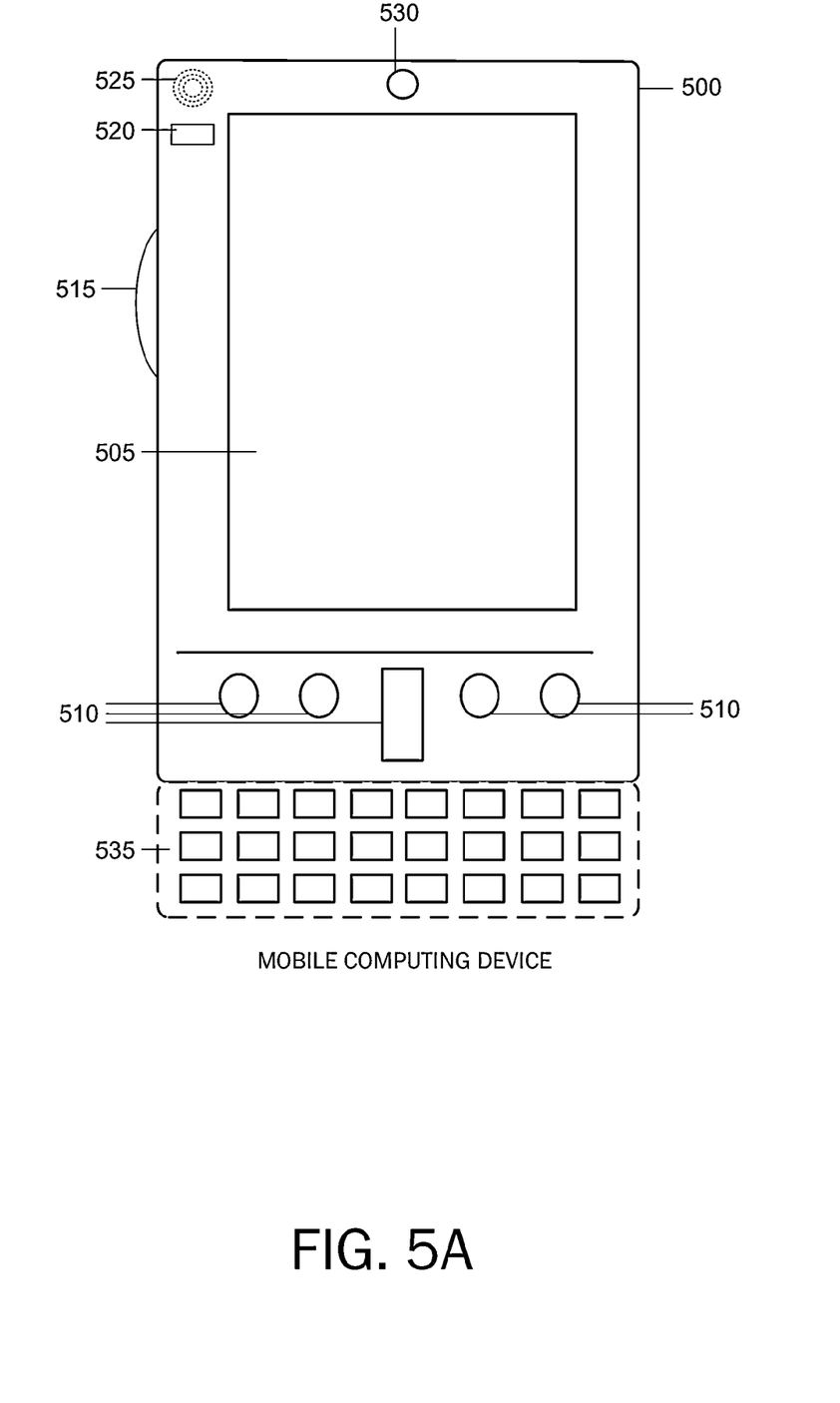
FIGS. 5A and 5B are simplified block diagrams of a mobile computing device with which embodiments of the present invention may be practiced.
Figure 5B:
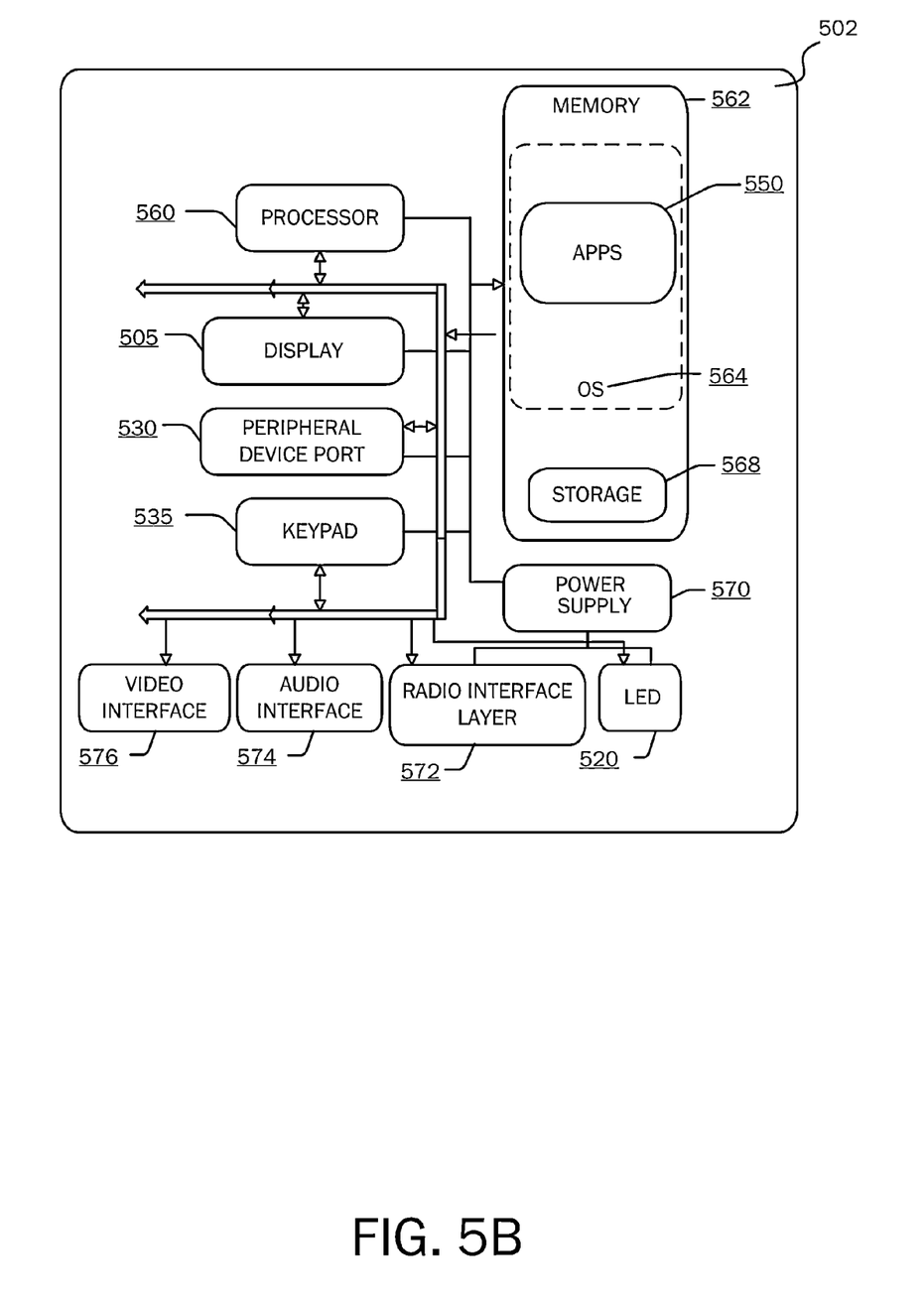
Figure 6:
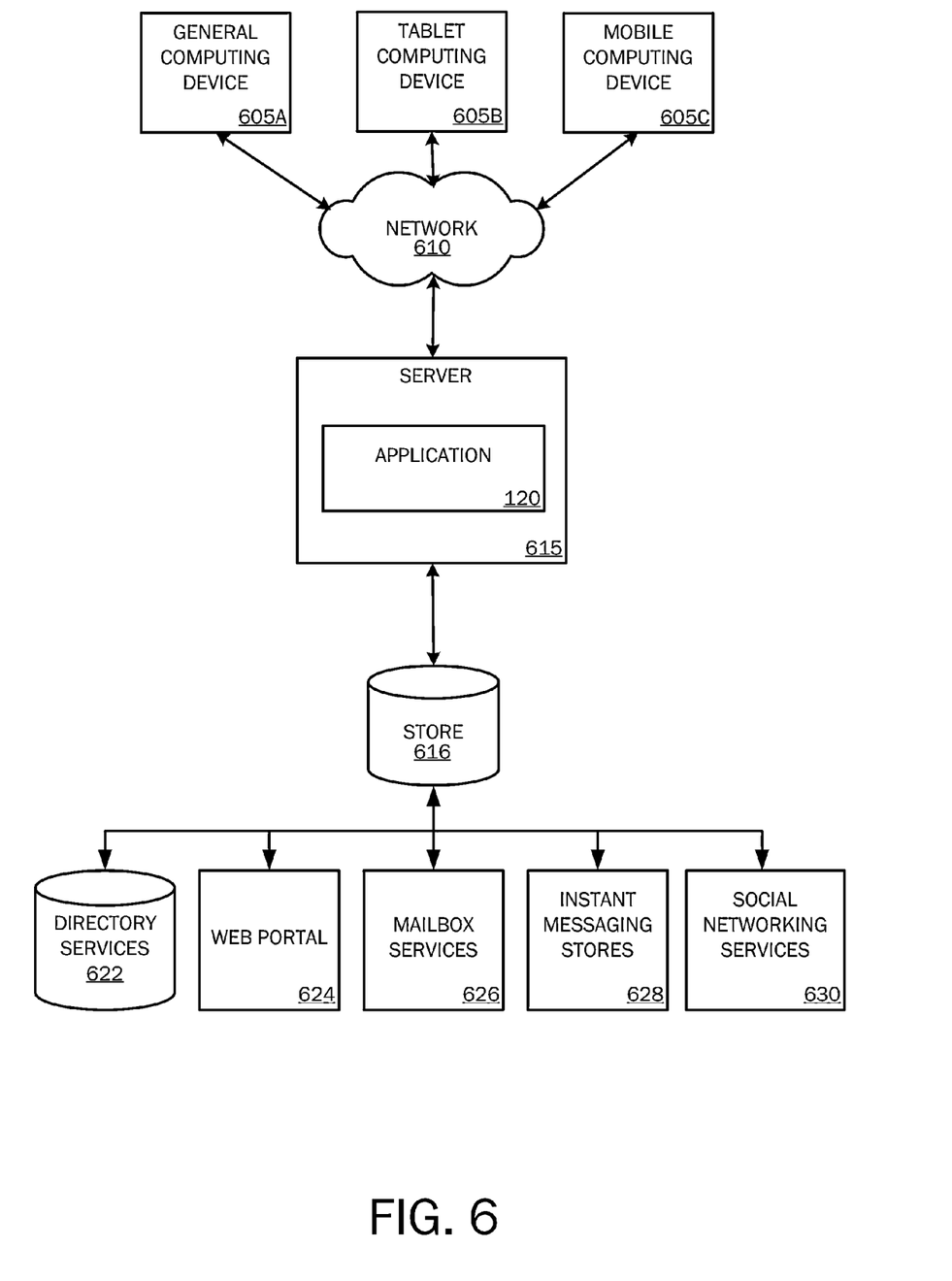
FIG. 6 is a simplified block diagram of a distributed computing system in which embodiments of the present invention may be practiced.

FIGS. 4-6 and the associated descriptions provide a discussion of a variety of operating environments in which embodiments of the invention may be practiced. However, the devices and systems illustrated and discussed with respect to FIGS. 4-6 are for purposes of example and illustration and are not limiting of a vast number of computing device configurations that may be utilized for practicing embodiments of the invention, described herein.

FIG. 4 is a block diagram illustrating physical components (i.e., hardware) of a computing device 400 with which embodiments of the invention may be practiced. The computing device components described below may be suitable for the client device 118 described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 450 such as the aggregator 108, ranking system 115, or client application 120. The operating system 405, for example, may be suitable for controlling the operation of the computing device 400. Furthermore, embodiments of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the stages of the method 300 illustrated in FIG. 3. Other program modules that may be used in accordance with embodiments of the present invention and may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing a network map of an individual's implicit and explicit people relationships across multiple workloads may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which embodiments of the invention may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 550 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one embodiment of the architecture of a system for providing a network map of an individual's implicit and explicit people relationships across multiple workloads, as described above. Content developed, interacted with, or edited in association with the application 120 may be stored in different communication channels or other storage types. For example, various documents may be stored using a directory service 622, a web portal 624, a mailbox service 626, an instant messaging store 628, or a social networking site 630. The application 120 may use any of these types of systems or the like for providing a network map of an individual's implicit and explicit people relationships across multiple workloads, as described herein. A server 615 may provide the application 120 to clients 118. As one example, the server 615 may be a web server providing the application 120 over the web. The server 615 may provide the application 120 over the web to clients 118 through a network 610. By way of example, the client computing device 118 may be implemented and embodied in a personal computer 605A, a tablet computing device 605B and/or a mobile computing device 605C (e.g., a smart phone), or other computing device. Any of these embodiments of the client computing device may obtain content from the store 616.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for providing a network map, the method comprising:
   receiving an indication of a selection by a user to view a network map of a first individual's people relationships across a plurality of information sources;
   querying a graph for relationship and activity data associated with the first individual, wherein querying a graph for relationship and activity data associated with the first individual comprises querying the graph for the first individual's node, for nodes connected to the first individual's node by relationship edges, and for nodes connected to the first individual's node by activity edges;
   querying the graph for relationship and activity data associated with the user;
   receiving relationship and activity data associated with the first individual and the user;
   generating a user interface for displaying the network map comprising the relationship and activity data associated with the first individual; and
   displaying the network map in the user interface, wherein displaying the network map in the user interface comprises displaying selectable thumbnail images of people whose nodes are connected to the first individual's node by relationship edges and displaying an activity stream of entities whose nodes are connected to the first individual's node by activity edges.

2. The method of claim 1, wherein the selectable thumbnail images are grouped according to a type of relationship the person shares with the individual, the types of relationships comprising one or more of:
   a manager relationship;
   a peer relationship;
   a directs relationship;
   a working with relationship; and
   a we both work with relationship.

3. The method of claim 2, wherein selectable thumbnail images grouped according to a we both work with relationship comprises selectable thumbnail images of people whose nodes are connected to both the first individual's node and the user's node by relationship edges.

4. The method of claim 1, further comprising:
   querying the graph for nodes connected by activity edges to the nodes connected to the first individual's node by relationship edges;
   calculating and applying weights to the activity edges according to a type of activity;
   determining one or more items that are trending around the individual according to a number of activity edges connected to the one or more items and the weight of the one or more activity edges; and
   displaying the one or more item trending items in the user interface.

5. The method of claim 1, further comprising:
   receiving an indication of a selection by the user to view a network map associated with a second individual;
   querying the graph for relationship and activity data associated with the second individual;
   receiving relationship and activity data associated with the second individual;
   generating a user interface for displaying the network map comprising the relationship and activity data associated with the second individual; and
   displaying the network map in the user interface.

6. The method of claim 1 wherein selectable thumbnail images grouped according to a we both work with relationship comprises selectable thumbnail images of people whose nodes are connected to both the first individual's node and the user's node by relationship edges.

7. The method of claim 1, further comprising:
   receiving an indication of a selection by the user to view a network map associated with a second individual;
   querying the graph for relationship and activity data associated with the second individual;
   receiving relationship and activity data associated with the second individual;
   generating a user interface for displaying the network map comprising the relationship and activity data associated with the second individual; and
   displaying the network map in the user interface.

8. A method for providing a network map, the method comprising:

receiving an indication of a selection by a user to view a network map of a first individual's people relationships across a plurality of information sources;

querying a graph for relationship and activity data associated with the first individual, querying the graph for relationship and activity data associated with the user;

receiving relationship and activity data associated with the first individual and the user;

generating a user interface for displaying the network map comprising the relationship and activity data associated with the first individual;

displaying the network map in the user interface; and querying the graph for nodes connected by activity edges to the nodes connected to the first individual's node by relationship edges;

calculating and applying weights to the activity edges according to a type of activity;

determining one or more items that are trending around the individual according to a number of activity edges connected to the one or more items and the weight of the one or more activity edges; and displaying the one or more item trending items in the user interface.

9. The method of claim 8, wherein querying a graph for relationship and activity data associated with the first individual comprises querying the graph for the first individual's node, for nodes connected to the first individual's node by relationship edges, and for nodes connected to the first individual's node by activity edges.

10. The method of claim 9, wherein displaying the network map in the user interface comprises displaying selectable thumbnail images of people whose nodes are connected to the first individual's node by relationship edges and displaying an activity stream of entities whose nodes are connected to the first individual's node by activity edges.

11. The method of claim 10, wherein the selectable thumbnail images are grouped according to a type of relationship the person shares with the individual, the types of relationships comprising one or more of:
- a manager relationship;
- a peer relationship;
- a directs relationship;
- a working with relationship; and
- a we both work with relationship.

12. A system comprising a processor coupled to computer-readable storage media, the computer readable-storage media storing instructions that when executed perform a method for providing a network map, the method comprising:

receiving an indication of a selection by a user to view a network map of a first individual's people relationships across a plurality of information sources;

querying a graph for relationship and activity data associated with the first individual, wherein querying a graph for relationship and activity data associated with the first individual comprises querying the graph for the first individual's node, for nodes connected to the first individual's node by relationship edges, and for nodes connected to the first individual's node by activity edges;

querying the graph for relationship and activity data associated with the user;

receiving relationship and activity data associated with the first individual and the user;

generating a user interface for displaying the network map comprising the relationship and activity data associated with the first individual; and displaying the network map in the user interface, wherein displaying the network map in the user interface comprises displaying selectable thumbnail images of people whose nodes are connected to the first individual's node by relationship edges and displaying an activity stream of entities whose nodes are connected to the first individual's node by activity edges.

13. The method of claim 12, wherein the selectable thumbnail images are grouped according to a type of relationship the person shares with the individual, the types of relationships comprising one or more of:
- a manager relationship;
- a peer relationship;
- a directs relationship;
- a working with relationship; and
- a we both work with relationship.

14. The method of claim 12, wherein selectable thumbnail images grouped according to a we both work with relationship comprises selectable thumbnail images of people whose nodes are connected to both the first individual's node and the user's node by relationship edges.

15. The method of claim 12, further comprising:

querying the graph for nodes connected by activity edges to the nodes connected to the first individual's node by relationship edges;

calculating and applying weights to the activity edges according to a type of activity;

determining one or more items that are trending around the individual according to a number of activity edges connected to the one or more items and the weight of the one or more activity edges; and displaying the one or more item trending items in the user interface.

16. The method of claim 12, further comprising:

receiving an indication of a selection by the user to view a network map associated with a second individual;

querying the graph for relationship and activity data associated with the second individual;

receiving relationship and activity data associated with the second individual;

generating a user interface for displaying the network map comprising the relationship and activity data associated with the second individual; and displaying the network map in the user interface.

* * * * *